(12) United States Patent
Mahoney et al.

(10) Patent No.: US 6,199,867 B1
(45) Date of Patent: Mar. 13, 2001

(54) ROTARY MOTION FEEDTHROUGH DEVICE

(75) Inventors: David G. Mahoney, Londonderry, NH (US); Walter Helgeland, Quechee, VT (US)

(73) Assignee: Rigaku/USA, Inc., Danvers, MA (US)

( * ) Notice: Subject to any disclaimer, the term of this patent is extended or adjusted under 35 U.S.C. 154(b) by 0 days.

(21) Appl. No.: 09/185,432

(22) Filed: Nov. 3, 1998

Related U.S. Application Data

(63) Continuation-in-part of application No. 08/940,777, filed on Sep. 30, 1997, now Pat. No. 5,975,536.

(51) Int. Cl.$^7$ ............................................. F16J 15/40
(52) U.S. Cl. ............................................. 277/410; 310/90.5
(58) Field of Search ........................... 277/410; 310/90.5

(56) References Cited

U.S. PATENT DOCUMENTS

| | | | |
|---|---|---|---|
| 3,612,630 | 10/1971 | Rosensweig | 308/10 |
| 3,620,584 | 11/1971 | Rosenweig | 308/187.1 |
| 3,734,578 | 5/1973 | Rosensweig | 308/10 |
| 3,810,055 | 5/1974 | Wright | 335/285 |
| 3,917,538 | 11/1975 | Rosensweig | 252/62.51 |
| 3,940,150 | 2/1976 | Martin et al. | 277/22 |
| 4,054,293 | 10/1977 | Hoeg et al. | 277/13 |
| 4,281,724 | 8/1981 | Garrett | 175/195 |
| 4,309,040 | 1/1982 | Pierrat | 277/80 |
| 4,502,700 | 3/1985 | Gowda et al. | 277/80 |
| 4,527,805 | 7/1985 | Gowda et al. | 277/80 |
| 4,605,233 | 8/1986 | Sato | 277/80 |
| 4,865,334 | 9/1989 | Raj et al. | 277/80 |
| 4,995,622 | 2/1991 | Fuse | 277/80 |
| 5,007,513 | 4/1991 | Carlson | 192/21.5 |
| 5,118,118 | * 6/1992 | Tadi et al. | 277/410 |
| 5,554,900 | 9/1996 | Pop, Sr. | 310/156 |
| 5,826,885 | 10/1998 | Helgeland | 277/302 |

FOREIGN PATENT DOCUMENTS

| | | |
|---|---|---|
| 0450 824 A1 | 10/1991 | (EP) . |
| 0921 336 A2 | 6/1999 | (EP) . |
| 2-51668 | 2/1990 | (JP) . |
| 3-172617 | 7/1991 | (JP) . |
| 1827485 A1 | 4/1991 | (SU) . |
| 99-17040 | 4/1999 | (WO) . |

OTHER PUBLICATIONS

Genmark Pole Piece shown in drawings 94111810, 94111801 and 94111800 of Rigaku/USA, Inc. sold Feb. 16, 1995.

* cited by examiner

*Primary Examiner*—Anthony Knight
*Assistant Examiner*—Enoch E Peavey
(74) *Attorney, Agent, or Firm*—Hamilton, Brook, Smith & Reynolds, P.C.

(57) ABSTRACT

A rotary motion feedthrough is described for coupling rotary motion from a rotatable shaft between an atmospheric side to a vacuum side by providing a dynamic magnetic seal of ferrofluid about the shaft using a non-rotating magnetic system formed of a unitary pole piece with magnets contained in radial slots formed in an inner diameter of the pole piece opposite the shaft.

20 Claims, 3 Drawing Sheets

ROTARY MOTION FEEDTHROUGH DEVICE

RELATED APPLICATION(S)

This application is a Continuation-in-Part of application Ser. No. 08/940,777 filed Sep. 30, 1997, now U.S. Pat. No. 5,975,536 the contents of which are incorporated herein by reference in its entirety.

BACKGROUND OF THE INVENTION

This invention pertains to rotary motion feedthrough devices which are sealed by magnetic fluid ("ferrofluid"). Such devices commonly employ a magnetic pole piece assembly to provide suitable magnetic flux in a set of annular gaps disposed axially along a rotating shaft.

FIGS. 1A and 1B taken from U.S. patent application Ser. No. 08/940,777 referenced above show a typical example of a rotary motion feedthrough structure 100 of the prior art. Five pole piece rings 20 are arranged in a stack with four ring magnets 18 to form a pole piece assembly 16. The entire assembly is mounted within a housing 10, which also supports a shaft 14 and a bearing 12 assembly.

Shaft 14 has an outside diameter slightly smaller than the inside diameter of pole rings 20, so a small annular gap 22 exists between each pole ring and the shaft. This gap is typically 0.002 inch in radial dimension. Ferrofluid fills each gap, being held in place by magnetic forces.

A sealing material (not shown) fills empty spaces 21 (FIG. 3) between the magnets 18 and pole rings 20, preventing leakage from the outer diameter of the pole rings radially inward to the ferrofluid sealing region. It is necessary to provide static sealing (as will be described below) at every one of the eight interfaces between pole rings 20 and ring magnets 18. If this is not done, each of the seals made by the eight fluid rings would be bypassed by gas leaking across the pole ring/magnet interfaces. This would result in the full pressure differential (typically 1 atmosphere) appearing across the final fluid ring at the left end of the pole piece. Since it is not possible to support this much pressure difference across a single fluid ring, the seal would fail. If carefully formulated and applied, the sealing material also serves to provide mechanical retention of the magnets 18 in their proper locations. A single O-ring seal 30 provides static sealing between the pole piece assembly 16 and housing 10 at the vacuum side of the pole piece.

The five pole piece rings 20 must be precisely aligned (typically within 0.0005") with each other and with the axis of the rotating shaft in order to produce eight annular gaps 22 which can be filled with ferrofluid. This alignment is accomplished during assembly of the pole piece by mounting the pole rings 20 on a fixturing shaft (not shown) having a diameter which matches the inner diameter (ID) of the pole rings very closely (typically within 0.0002"). The stack of pole rings and magnets is then held on the fixture and a static sealing material (typically epoxy resin and hardener) is applied and allowed to cure. Curing time is usually several hours.

FIG. 2 is an isometric view of a typical single pole ring 20 of the prior art with a circular array of short cylindrical magnets 18A placed on one surface. Although a single ring magnet could be used, an array of small magnets is often used instead, because many different seal sizes can be made using only one or two types of standardized small magnets, thereby simplifying production planning and inventory control. Typical magnet dimensions are 4.5 mm or 9 mm diameter and 2 mm high. Enough magnets are placed in each layer to occupy substantially the entire space available. It is clear from FIG. 2 that a lot of empty space must be filled with sealing material.

Close examination of FIG. 2 also reveals that a small raised rim 15 exists at the outer diameter of the pole ring. Each magnet has been placed so that it abuts the inner diameter of this rim. The rim is required because the magnets exert mutually repulsive forces on each other, tending to push all magnets radially away from the axis of the pole ring. This force becomes particularly significant as the last magnet is placed on the ring. If there were no retaining rim, one or more magnets might move radially outward and protrude beyond the outer diameter of the pole ring.

FIG. 3 shows a stack of four pole rings 18A and their associated magnet layers in a complete pole piece assembly. The topmost pole ring has been omitted for clarity.

SUMMARY OF THE INVENTION

In accordance with the invention a rotary motion feedthrough device is provided for coupling rotary motion from a high pressure (atmospheric) environment to a low pressure (vacuum) environment. The device is characterized by a unitary pole piece construction. The unitary pole piece is formed of a single cylindrical member having an inner and outer diameter and is made from a ferromagnetic metal, such as, stainless steel. Slots extending radially outward from the inner diameter of the member are filled with one or more magnets, the magnets in each slot having the same polarity, while magnets in alternate slots have opposite polarity. Magnetic pole tips are formed in the inner diameter laterally adjacent the slots. Ferrofluid (magnetic fluid) is contained in the space between the pole tips.

A rotatable shaft extends along the inner diameter of the pole piece in close proximity thereto and a stationary housing encircles the pole piece. The magnetic flux generated by the magnets is coupled to the fluid in the tip spaces and creates a non-rotating dynamic gas seal between the rotatable shaft and a housing which coaxially encircles the pole piece.

A groove for accepting an O-ring seal is formed on the outer diameter of the pole piece at an end of the pole piece disposed nearest the low pressure environment. Optional water cooling channels and O-ring sealing channels may be formed in the outer diameter of the pole piece to the extent water cooling of the device is desired.

Problems which are inherent to the prior art of FIGS. 1A, 1B, 2 and 3 include cost, reliability, processing time, precision of alignment and uneven spacing of magnets. These problems are discussed in detail below.

Each pole ring must be produced to the required accuracy, and must be inspected to assure that it conforms to the requirement. The required assembly fixture must be produced to even tighter tolerance than the rings. The assembly process requires skilled labor. These are all costly aspects of the prior art. Because a pole piece constructed according to the prior art contains many individual pieces, the reliability of the assembly is reduced. If any portion (pole ring, magnet, sealing material) is defective, the reliability of the entire assembly is compromised.

Reducing the parts count increases the reliability of the whole. It is necessary to leave the entire assembly on the fixture during the curing cycle of the sealing material. Typically, overnight curing at room temperature is employed. This means that work in process is increased and that multiple fixtures may be required for pole pieces which are in large volume production. In addition to the obvious cost implications, these considerations result in a less flexible production environment.

Because there is some tolerance on the ID of pole rings, no two rings within a set will have exactly the same ID. Therefore, they cannot be perfectly aligned on a fixture. In most cases, alignment is good enough for practical purposes, but in extreme cases (e.g., extremely high speeds or minimum number of sealing stages) a closer approach to perfect alignment would be desirable. The multiple-piece nature of the prior art inherently limits how closely this art can approach perfection. Magnets should be evenly spaced when placed on the pole rings. If they are not, the overall magnetic field will be uneven and some deviation in seal properties (e.g., reduced pressure capacity) may be observed.

The present invention addresses and resolves four of the above referenced difficult aspects of the prior art: (1) precise axial alignment of sealing stages, (2) static sealing of interstage bypass leakage, (3) retention and radial distribution of magnets, and (4) additional size and cost incurred if water cooling of the seal is required.

As previously noted, the prior art pole piece assembly usually includes two to five pole rings and one or more magnets. All of these elements must be assembled in a manner which establishes and maintains critical mechanical alignment among the elements. One method of establishing this alignment is to build up the pole piece as a subassembly using special fixtures. Another method is to use the feedthrough housing to provide the alignment at the time of final assembly. In both methods, sealing means must be provided to prevent interstage bypass leakage along the outside of the pole piece. If multiple small magnets are used, as is commonly the case, some means must also be employed to position the magnets correctly, and to retain them in that position during and after assembly.

This invention provides all pole rings as geometric features within a single machined part. The critical alignment within the pole piece is easily achieved by conventional machining operations, and is automatically built into the pole piece. No assembly fixture is needed to achieve this alignment. Accuracy requirements for the housing are also less critical. This invention also provides a continuous exterior wall with no breaks or openings separating sealing stages. Interstage bypass leaks cannot exist, so it is not necessary to provide sealing means for such leaks. Finally, this invention provides a simple, built-in means of correctly positioning and retaining the magnets during and after assembly.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

While this invention has been particularly shown and described with references to preferred embodiments thereof, it will be understood by those skilled in the art that various changes in form and details may be made therein without departing from the spirit and scope of the invention as defined by the appended claims. Note, since the device is radially symmetrical, only the top half is shown in some of the drawings for simplicity.

Figure 4:
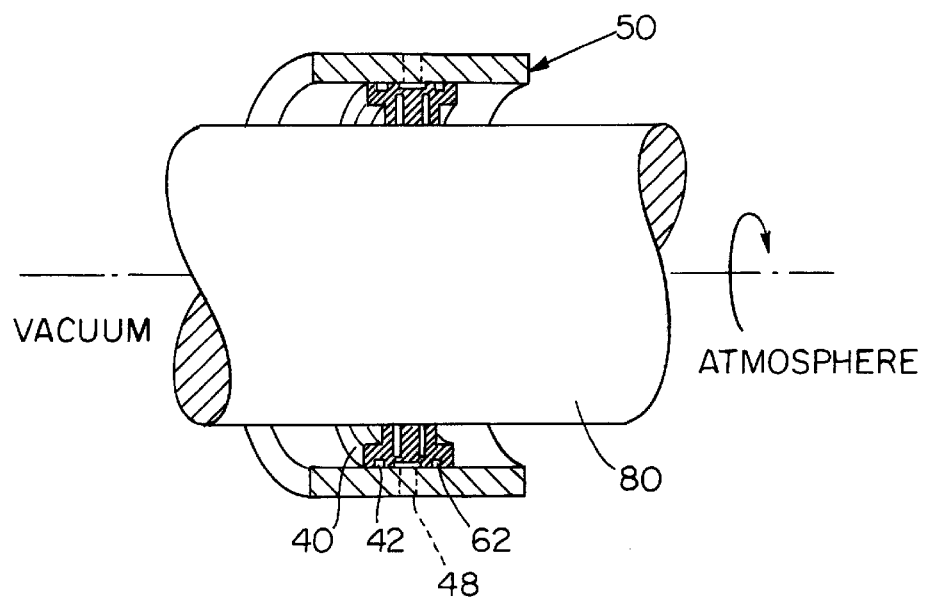
FIG. 4 is a longitudinal partial schematic section of a rotary feedthrough of the present invention.
Figure 5:
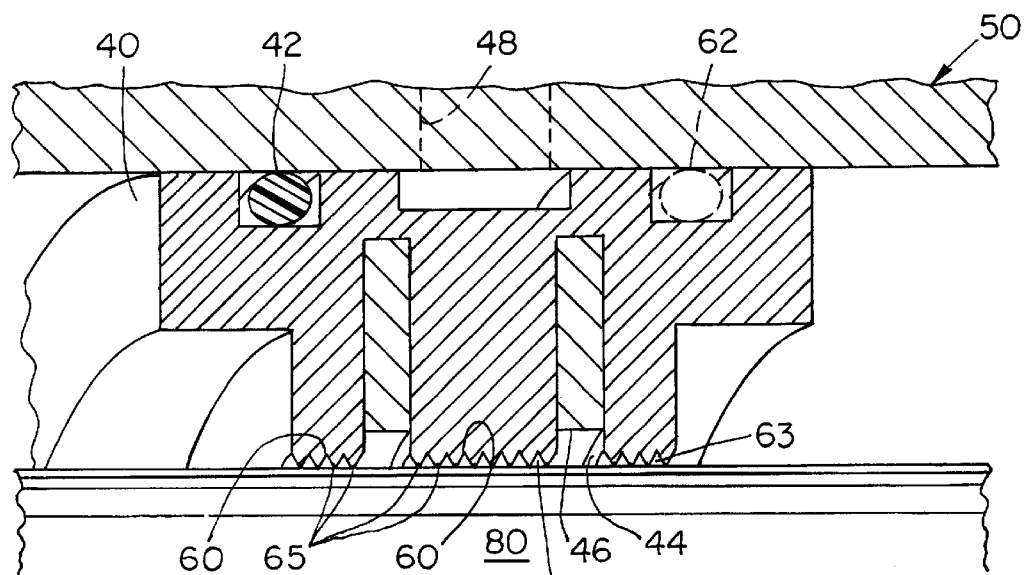
FIG. 5 is an enlarged longitudinal partial schematic section of a unitary pole piece for the feedthrough of FIG. 4 of the present invention.

Referring now to FIGS. 4 and 5 of the drawings a preferred embodiment of the invention is shown in which the entire set of pole rings and bypass seals is machined as a single piece. For example, a single piece 40 of ferromagnetic stainless steel, e.g., 17-4 PH alloy or 400-series stainless steel alloy is machined into a ring with an O-ring sealing groove 42 formed on the OD and magnetic pole tips 60 on the ID. The pole tips 60 at the ID of the unitary pole ring 40 are machined as a series of small V-grooves 63 in the ID of the single machined part 40. The single machined part 40 is first made with a smooth bore at a carefully controlled diameter. Then large slots (for magnets) are machined into the ID. Then the series of V-grooves 63 are machined to a depth which leaves a small portion of the original ID intact between each pair of adjacent V-grooves. FIG. 5 shows two magnet slots 44 and a plurality of V-grooves 63 in an arrangement which results in small regions 60 which are left over from the original ID bore. These regions 60 are the pole tips. It is in the gap between these pole tips and the shaft that the most intense magnetic field develops, and it is here that the magnetic fluid (represented by "dots" 65 in FIG. 5) is retained by magnetic forces. Also machined into the ID of the pole piece ring 40 are a pair of slots 44 on either side of the central pole tips. The slots are large enough to accept magnets 46. The slot width is slightly larger than the magnet thickness (e.g., 2.05 mm slot width for 2.00 mm magnet thickness). This permits easy insertion of magnets 46 and allows the magnets to move radially and longitudinally within the slots. As more magnets are inserted, the mutually repulsive force serves to position each magnet equidistant from its neighbors, thereby automatically providing even spacing throughout the magnet layer. Magnets are added to each slot until the slot cannot accept any more magnets.

Typically the magnets are short cylinders, although they could also be quadrants, sextants, or octants. Rare earth magnets, such as SmCo or Nd B Fe with high energy products (20 to 35 MGO) are preferred to overcome the losses arising from the inherent shunting effect discussed below. Magnets are polarized through their thickness (parallel to the shaft axis). Within each magnet slot 44 the polarity is the same. From one slot to the next, the polarity alternates, so that alternate layers of magnets oppose each other. Any number of magnet layers can be used, but an even number is preferred (for cancellation of fringe fields). One layer is sufficient for all vacuum applications, although two are normally employed. For applications with larger pressure differentials, a greater number of layers can be used. Note that the outer surface of the pole piece 40 is continuous from the atmosphere side to the vacuum side. While it does contain grooves (three grooves are illustrated), it must not contain breaks which would connect from any interior region (e.g., magnet slots) to the OD. This precludes bypass leaks and also insures that all pole tip sealing stages will be very well aligned because they all will be made in the same final machining operation.

Figure 1B:
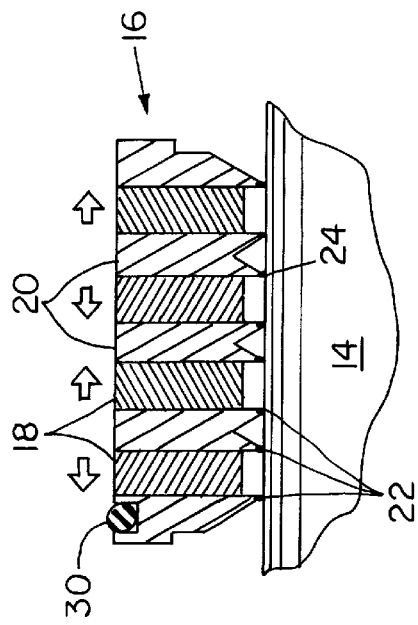
FIG. 1B is an exploded view of a portion of FIG. 1A.
Figure 1A:
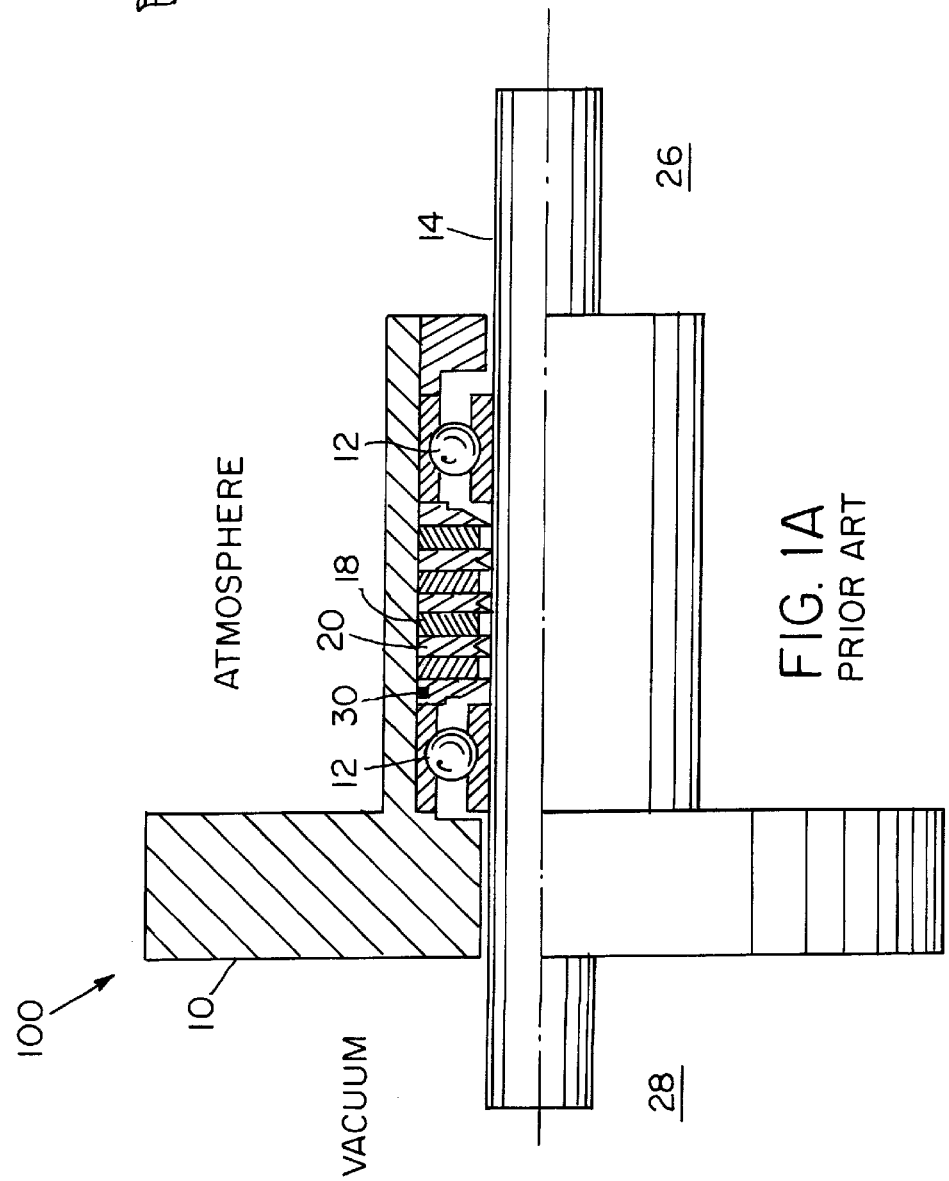
FIG. 1A is a longitudinal partial schematic section of a prior art rotary feedthrough.
Figure 2:
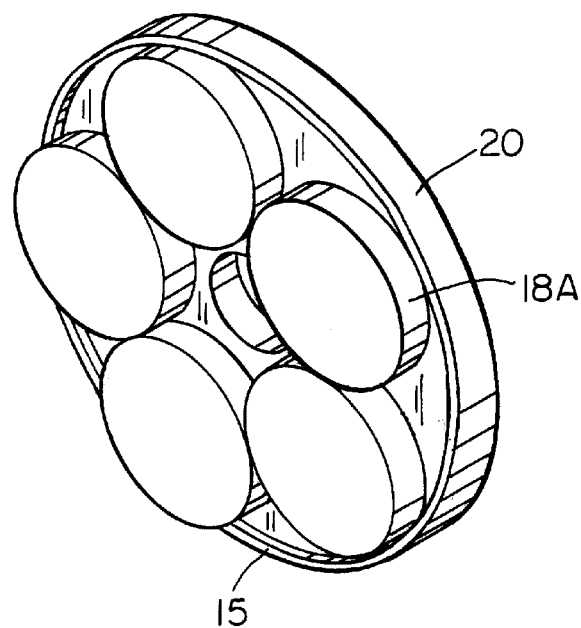
FIG. 2 is a perspective view of a single prior art pole piece ring with five circular magnets.
Figure 3:
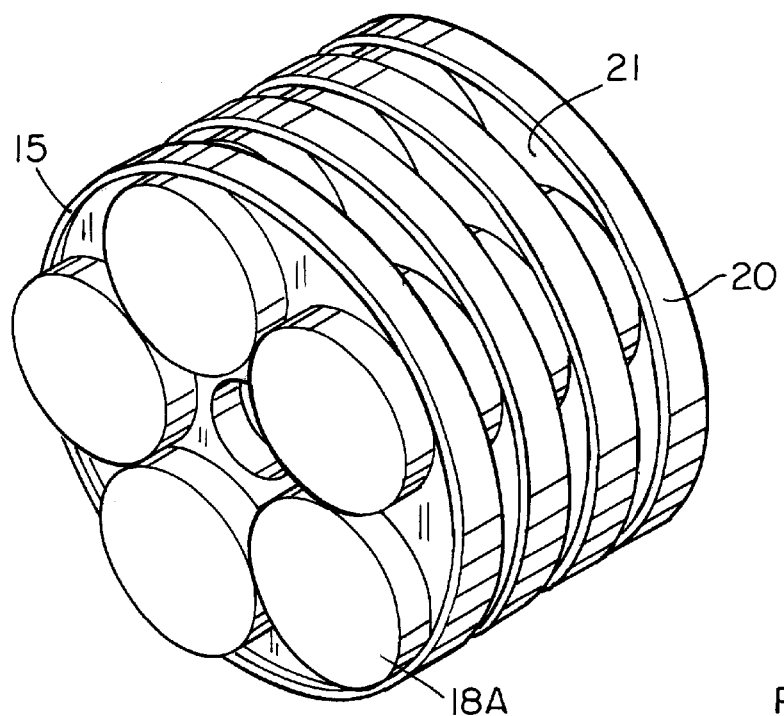
FIG. 3 is a view as in FIG. 2 of four separate pole piece rings of the prior art construction.

If water cooling is desired, an optional cooling water channel 48 on the OD of the pole piece may be provided, as illustrated, along with an O-ring seal channel 62. Very simple water supply connections (not shown) via the housing. Only one water cooling channel is needed, and it is provided as a simple machined groove without increasing either the length or diameter of the pole piece 40. In the prior art (FIG. 1) it is customary to increase the length of the outermost pole rings in order to provide water channels. In other competitive products two separate grooves are required because two separate pole pieces are employed.

The continuous outer surface of the pole piece 40 provides a magnetic shunt around each magnet. This dissipates some of the magnetic energy which would otherwise be available to the magnetic circuits which contain the sealing gaps. The situation is the mirror image of that described in the previously referenced parent application, application Ser. No. 08/940,777. In that invention, ferrofluid sealing is accomplished on the OD of a rotating shaft containing magnets in slots, with the interior of the shaft serving as a magnetic shunt. In the current invention, sealing is accomplished on the ID of a stationary pole piece containing magnets in slots, with the exterior of the pole piece serving as a magnetic shunt. In both cases, there is sufficient magnetic energy in the permanent magnets in the slots to provide high flux density in the sealing gaps, despite the shunting effect.

A ferrofluid 65 is provided in the tips 60 and the pole piece 40 is affixed to the housing 50 and the housing affixed to a flange (not shown) as described in the parent Helgeland reference U.S. Pat. No. 5,826,885 incorporated herein it its entirety by reference. In turn, the flange can be affixed to a suitable fixture disposed between the two atmospheres with the shaft 80 extending therebetween.

Equivalents

While this invention has been particularly shown and described with references to a preferred embodiment thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A device for coupling rotary motion between first and second environments separated by a barrier comprising:
   a. magnets;
   b. a unitary cylindrical member having an inner diameter and an outer diameter;
      (i) slots extending radially outward from the inner diameter of the member, the slots having a sufficient width and depth to accept said magnets;
      (ii) at least one groove extending radially inward from the outer diameter of the member for accepting a static seal; and
      (iii) magnetic pole tips formed on the inner diameter of the member laterally adjacent to the slots and adapted to contain magnetic fluid between said tips;
   c. a rotatable shaft adapted to extend along the inner diameter of the member between the first and second environments; and
   d. a housing radially enclosing the member.

2. The device of claim 1 wherein the magnets are polarized and the polarity is the same in each respective slot whereas the polarity alternates in each adjacent slot so that magnets in alternate slots oppose each other.

3. The device of claim 1 wherein the periphery of the inner surface of the member facing the shaft is continuous.

4. The device of claim 1 wherein the member is formed of ferromagnetic material.

5. The device of claim 1 wherein the pole tips are formed of triangular shaped grooves.

6. The device of claim 5 wherein the magnets have an energy product equal to or greater than about 20 MGO.

7. A device for coupling rotary motion between first and second environments separated by a barrier comprising:
   a. a housing affixed to said barrier;
   b. a rotatable shaft extending from the first environment to the second environment through the housing; and
   c. a non-rotatable magnet system, intermediate the ends of the shaft, forming a dynamic gas seal between the rotatable shaft and the fixed housing, the system including a unitary pole piece having an inner diameter and an outer diameter with magnets disposed in slots formed in the inner diameter with pole piece tips containing ferrofluid disposed adjacent to said slots.

8. The device of claim 7 wherein the magnet system includes at least two magnets of opposite polarity mounted in said slots coaxial to said shaft for generating lines of magnetic flux, and wherein at least a portion of the housing adjacent to the magnet system is formed of ferromagnetic material.

9. The device of claim 8 in which the ferrofluid is retained in the magnetic flux by magnetic force.

10. The device of claim 7 wherein a cooling channel is formed in the outer diameter of the unitary pole piece between a pair of adjacent radially inward extending grooves also formed in the outer diameter of the unitary pole piece and wherein a static seal is provided in each of said grooves.

11. The device of claim 10 wherein the static seals are O-rings.

12. The device of claim 7 wherein the periphery of the unitary pole piece facing the shaft is continuous.

13. A magnetic fluid sealing device comprising:
   a. a housing;
   b. an axially extending shaft rotatably mounted within said housing and wherein one end of the shaft is adapted to be disposed at a low pressure environment and another end at a high pressure environment;
   c. a tubular cylindrical unitary pole piece having an inner diameter and an outer diameter, with slots formed in the inner diameter for retaining magnets therein and pole piece tips formed in said inner diameter adjacent said slots for retaining magnetic fluid therein;
   d. at least one magnet for generating a magnetic flux which flux extends through portions of said housing, the magnet and pole piece radially encircling said shaft and forming with said magnetic fluid a magnetic fluid seal for sealing of any gaps which may exist between the shaft and the pole piece.

14. The device of claim 13 wherein the housing is formed of magnetic material.

15. A method of forming a dynamic seal for a rotary shaft enclosed by a housing, the shaft having first and second ends adapted to be axially extended between a low pressure atmosphere and a higher pressure atmosphere comprising the steps of:

a. forming a unitary pole piece;
   b. forming a magnetic seal about radial gaps in the unitary pole piece radially located between the shaft and the housing using magnetic energy;
   c. providing at least one magnet affixed to a radial slot formed in an inner diameter of the pole piece; and
   d. providing a ferrofluid in said gaps which is retained by said magnetic energy.

16. The method of claim 15 including providing at least two magnets axially spaced from one another.

17. The method of claim 15 wherein the magnets are of opposed polarity and including the step of retaining the magnets from axial or longitudinal movement.

18. The method of claim 15 including providing a water cooling channel in an outer diameter of the unitary pole piece.

19. The method of claim 18 including the step of providing a static seal in a groove formed in the outer diameter of the unitary pole piece laterally adjacent to the cooling channel nearest the higher pressure atmosphere.

20. The method of assembling a dynamic seal for a rotary shaft adapted to extend between a low pressure atmosphere and a higher pressure atmosphere comprising the steps of:

a. providing a unitary tubular cylindrical pole piece having radial slots formed in an inner diameter thereof and magnetic pole tips adjacent the slots also on an inner diameter thereof;
   b. inserting magnets in said slots;
   c. inserting said shaft through said inner diameter;
   d. mounting the shaft, pole piece and magnets on a fixed housing and coupling magnetic fluid into the pole tips.

* * * * *